J. W. NIPPER.
VALVE FACING TOOL.
APPLICATION FILED JULY 9, 1920.

1,394,573.

Patented Oct. 25, 1921.

Inventor
John W. Nipper
By Cyrus Kehr
Attorney

J. W. NIPPER.
VALVE FACING TOOL.
APPLICATION FILED JULY 9, 1920.
1,394,573.
Patented Oct. 25, 1921.
2 SHEETS—SHEET 2.
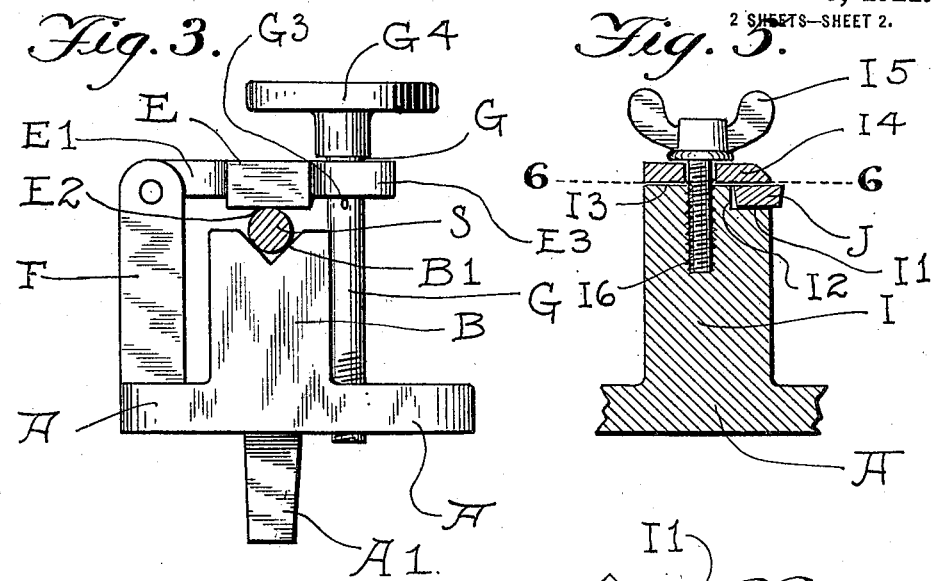
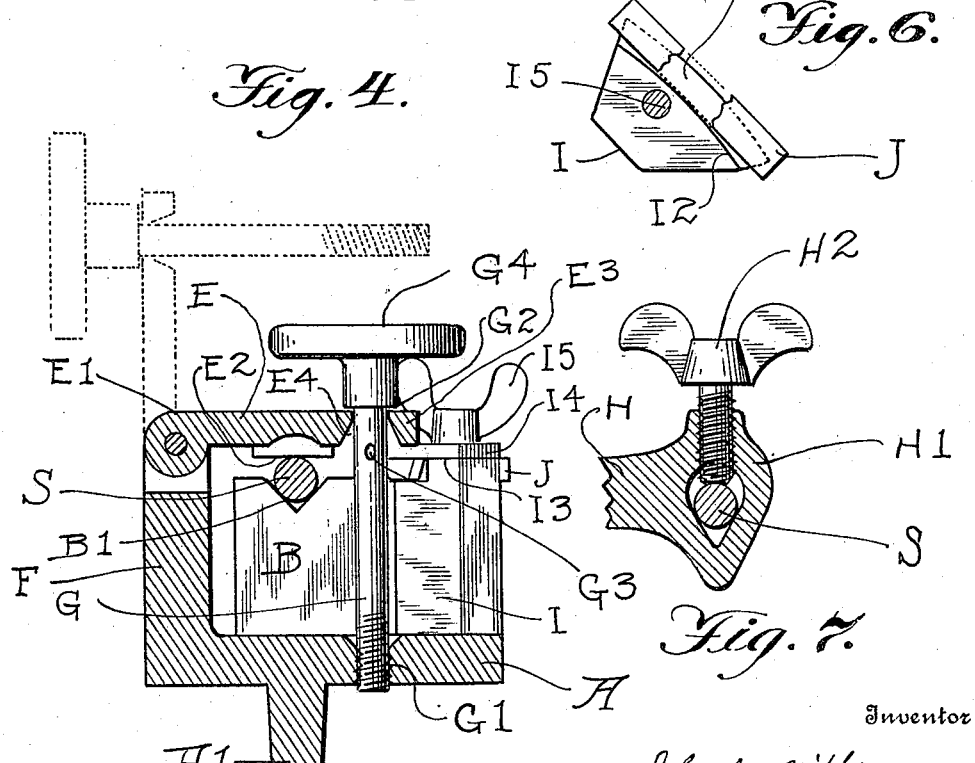
Inventor
John W. Nipper
By Cyrus K Ehr
Attorney

UNITED STATES PATENT OFFICE.

JOHN W. NIPPER, OF KNOXVILLE, TENNESSEE.

VALVE-FACING TOOL.

1,394,573. Specification of Letters Patent. Patented Oct. 25, 1921.

Application filed July 9, 1920. Serial No. 394,963.

*To all whom it may concern:*

Be it known that I, JOHN W. NIPPER, a citizen of the United States, residing at Knoxville, in the county of Knox and State of Tennessee, have invented a new and useful Improvement in Valve-Facing Tools, of which the following is a specification, reference being had to the accompanying drawing.

My improvement relates particularly to tools used for facing and refacing the valves of internal combustion engines. The object of the invention is to produce such a tool in simple form and adapted to easy and efficient operation.

In the accompanying drawings,

Fig. 3 is a section on the line, 3—3, of Figs. 1 and 2, looking toward the right;

Fig. 4 is a section on the line, 4—4 of Figs. 1 and 2, looking toward the right;

Fig. 5 is a section on the line, 5—5, of Fig. 1, looking in the direction of the arrow;

Fig. 6 is a horizontal section on the line 6—6, of Fig. 5;

Fig. 7 is an upright section on the line 7—7, of Fig. 2, looking toward the right.

Figure 1:
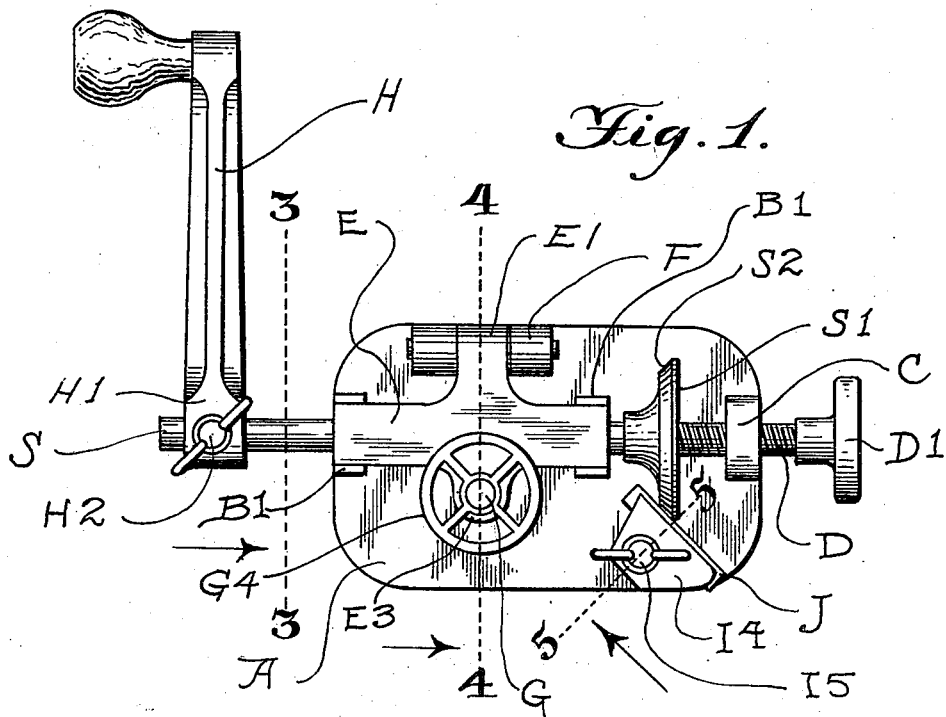
Figure 1 is a plan of a tool embodying my improvement.
Figure 2:
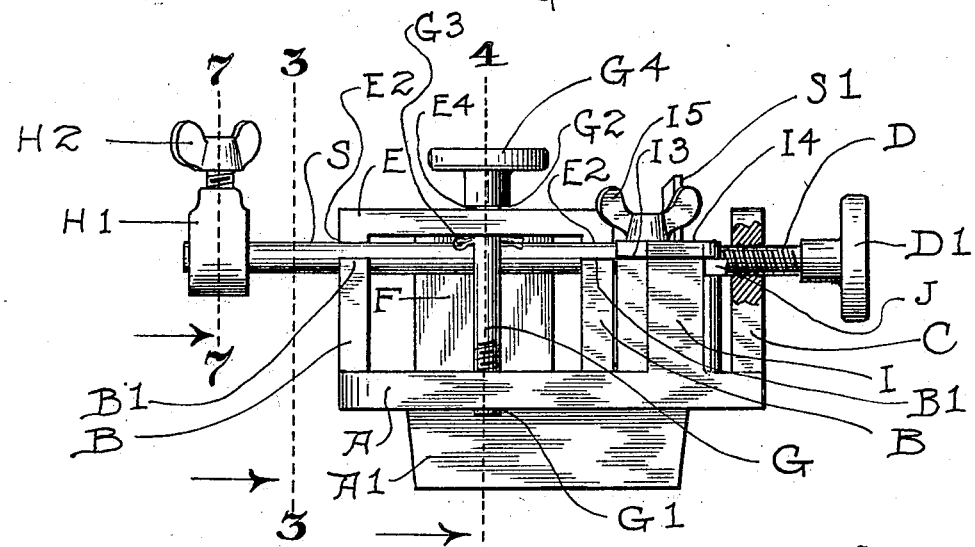
Fig. 2 is a front elevation of the same tool.

Referring to said drawings, A is a horizontal base casting. $A^1$ is a downward extension of said casting. This extension may be placed into a vise for temporarily holding the tool. From the base, A, rise two standards, B, B, in the upper end of each of which is a bearing, $B^1$, which receive the stem, S, of the valve. In alinement with the standards, B, B, is a similar standard, C, into the upper end of which is threaded a screw, D, in alinement with the stem, S, and positioned to bear against the center of the flat face of the head, $S^1$, of the valve. On the outer end of the screw, D, is a hand wheel, $D^1$, whereby said screw may be turned.

A clamping member, E, has a horizontal arm, $E^1$, which is hinged to the upper end of a standard, F, rising from the rear part of the base, A. Said clamping member reaches across the upper ends of the standards, B, B, and above each bearing, $B^1$, the clamping member has a flat bearing face, $E^2$.

Forward of the stem, S, is a forward extension, $E^3$, of the clamping member. An upright binding shaft, G, extends downward through an aperture, $E^4$, in the extension $E^3$. The lower end of said binding shaft is screw threaded into an aperture, $G^1$, formed in the base, A. The upper part of the aperture, $G^1$, is made flaring, as shown by the drawing, to facilitate the insertion of the lower end of said shaft. Above the extension, $E^3$, the binding shaft has a shoulder, $G^2$, which bears upon the upper face of said extension. The aperture, $E^4$, is made large enough to allow lateral turning of the shaft, in order that the lower end of the shaft may readily be positioned to enter the threaded aperture, $G^1$. Immediately below the extension, $E^3$, a cotter pin, $G^3$, extends through said shaft to prevent the shaft from falling out of the clamping member when the latter is turned backward on its hinge into the inverted position. On the upper end of said shaft is a hand wheel, $G^4$, which is to be grasped by the hand of the operator to turn said shaft.

When the lower end of the shaft, G, is free from the aperture, $G^1$, said shaft and the clamping member, E, are turned backward on the hinge of said member far enough to allow laying the stem, S, of the valve into the bearings, $B^1$, the head, $S^1$, of a valve being directed toward the screw, D. Then the clamping member is turned forward until the bearings, $E^2$, rest on the stem, S, and the lower end of the binding shaft is positioned for entering the bearing, $G^1$. Then the wheel, $G^4$, is turned for driving said shaft downward until the clamping member, E, is drawn sufficiently to cause the bearings, $E^2$, to engage the stem, S, with only sufficient pressure to hold said stem against sidewise movement and to permit rotation of the stem on its axial line. A hand crank, H, is then applied to the free end of the stem, S, the crank having an eye or socket, $H^1$, which receives the stem. A thumb screw, $H^2$, extends through the wall of said eye perpendicularly to the stem and is adapted to bear against said stem with sufficient force to immovably bind the crank to said stem. Now said crank may be turned by the operator to turn the stem, S, and the head, $S^1$.

While the stem is thus held against sidewise movement, it may move endwise as well as turn. Endwise movement away from the standard, C, is to be effected by driving the screw, D, forward—toward the left, as viewed in the drawings. Such movement is resisted by the knife which will next be described.

Forward of and near the valve head, $S^1$ is a standard, I, which supports the knife or cutter, J. On said standard is a horizontal ledge, 11, which is oblique to the axial line of the stem, S. At the front of said ledge is an upright, rearward curved face, 12, which forms an abutment for the knife and permits the turning of the knife in a horizontal plane on said abutment to change the angle between the cutting edge of the knife and said axial line. This is for the purpose of adapting the cutting edge of the knife to the angle of the seating face of the valve head, $S^1$. Above the abutment, 12, is a horizontal face, 13, on which rests a horizontal binding plate, 14. Said plate extends across said face, 13, and nearly across the knife, J. An upright thumb screw, 15, extends loosely through an aperture, 16, in the binding plate, 14, and is threaded into the standard, I, to firmly bind or clamp the knife after the latter has been set precisely parallel to the seating face, $S^2$, of the valve head, $S^1$.

When the knife has been thus set, the screw, D, is driven forward against the head, $S^1$, to force the valve endwise to bring the head into contact with the knife. Then the crank is turned for rotating said stem and head. As the work proceeds, the screw, D, is driven slightly forward until the facing of the head has been completed.

It is to be observed that the arrangement of the means for binding the valve stem is such as to require the use of only one binding shaft, although two bearings for the stem are provided on the standards, B, and on the clamping member. This simplifies construction of the mechanism and also simplifies the operation of the mechanism for inserting and removing the valves, it being necessary to release and connect only one shaft.

A single binding shaft is sufficient for securing the valve stem, S, in the bearings.

The knife, J, seated as described and secured by the binding plate, 14, may be long enough to provide two long cutting edges which may be presented alternately for cutting, and by moving the knife endwise, different parts of these edges may be brought into contact with the head by moving the knife endwise, when heads of different diameters are used.

Using the small knife clamped into position by the clamping plate gives a small mass of metal which can readily be tempered to produce the required high degree of hardness needed for maintaining good cutting edges.

I claim as my invention:

1. In a mechanism of the nature described, the combination of two bearings for the stem of a valve, a hinged clamping member adapted to bear upon said stem above each of said bearings, a screw for forcing said clamping member downward, a cutter located for engagement with the seat face of the head of the valve while the valve is being rotated, and means for engaging and rotating the valve, substantially as described.

2. In a mechanism of the nature described, the combination of two bearings for the stem of a valve, a hinged clamping member adapted to bear upon said stem above each of said bearings, a binding shaft for forcing said clamping member downward, a cutter located for engagement with the seat face of the head of the valve while the valve is being rotated, means for forcing the valve endwise to bring said seat face into engagement with the cutter, and means for engaging and rotating the valve, substantially as described.

3. In a mechanism of the nature described, the combination of two bearings for the stem of a valve, a hinged clamping member adapted to bear upon said stem above each of said bearings, a binding shaft for forcing said clamping member downward, said shaft being on one side of the axial line of the mechanism and the hinge of said clamping member being at the other side of said axial line, a cutter located for engagement with the seat face of the head of the valve while the valve is being rotated, and means for engaging and rotating the valve, substantially as described.

4. In a mechanism of the nature described, the combination of two bearings for the stem of a valve, a hinged clamping member adapted to bear upon said stem above each of said bearings, a binding shaft for forcing said clamping member downward, said shaft being on one side of the axial line of the mechanism and the hinge of said clamping member being at the other side of said axial line, a cutter located for engagement with the seat face of the head of the valve while the valve is being rotated, a screw for forcing the valve endwise, and means for engaging and rotating the valve, substantially as described.

5. In a mechanism of the nature described, the combination with means for supporting the stem of a valve to permit rotation and endwise movement, of a knife support having a curved upright abutment, a knife seated on said support and resting against said abutment, a binding plate for clamping said knife in said position, and means for engaging and rotating the valve, substantially as described.

6. In a mechanism of the nature described, the combination of means for supporting the stem of a valve to permit rotation and endwise movement, means for forcing the valve endwise, a knife support having a curved, upright abutment, a knife seated on said support and resting against said abutment, a binding plate for binding said knife in said position, and means for engaging and rotating the valve, substantially as described.

In testimony whereof I have signed my name, this 25th day of June, in the year one thousand nine hundred and twenty.

JOHN W. NIPPER.